United States Patent [19]

Rietsch

[11] Patent Number: 4,754,659
[45] Date of Patent: Jul. 5, 1988

[54] QUILL SHAFT INPUT CLUSTER GEAR FOR MANUAL TRANSMISSION

[75] Inventor: Donald R. Rietsch, Howell, Mich.

[73] Assignee: Ford Motor Company, Dearborn, Mich.

[21] Appl. No.: 927,638

[22] Filed: Nov. 6, 1986

[51] Int. Cl.[4] .............................................. F16H 57/00
[52] U.S. Cl. ........................................ 74/411; 464/97; 464/160
[58] Field of Search ..................... 74/411; 464/97, 160

[56] References Cited

U.S. PATENT DOCUMENTS

| | | | |
|---|---|---|---|
| 2,703,847 | 3/1955 | Kalikow | 464/97 X |
| 3,259,100 | 7/1966 | Kiekhaefer | 74/411 X |
| 3,321,988 | 5/1967 | Peras | 74/411 |
| 3,408,830 | 11/1968 | Sutaruk et al. | 464/160 X |
| 4,287,791 | 9/1981 | Numazawa et al. | 74/411 X |
| 4,377,093 | 3/1983 | Janson | 74/477 |

Primary Examiner—Dirk Wright
Attorney, Agent, or Firm—Frank G. McKenzie; Donald J. Harrington

[57] ABSTRACT

A manually-operated automotive transmission has a cluster gear on which several forward drive input gears and the reverse drive input gear are formed integrally. The cluster gear has a central bore extending its full length. An input shaft clutched to as engine crankshaft is keyed at the end furthest from the engine to the far end of the cluster gear and has a loose fitting spline connection to the opposite end of the cluster gear. A portion of the input shaft between the clutch and the loose spline connection has relatively high torsional stiffness and strength, but the portion of the input shaft between the keyed connection and the loose spline connection has relatively low torsional stiffness and strength. The clearance between the teeth of the loose spline connection is sized so that relatively low torque is not transmitted through this connection. The clearance is taken up and engine torque transmitted through the loose spline connection when high operating torques are developed.

12 Claims, 2 Drawing Sheets

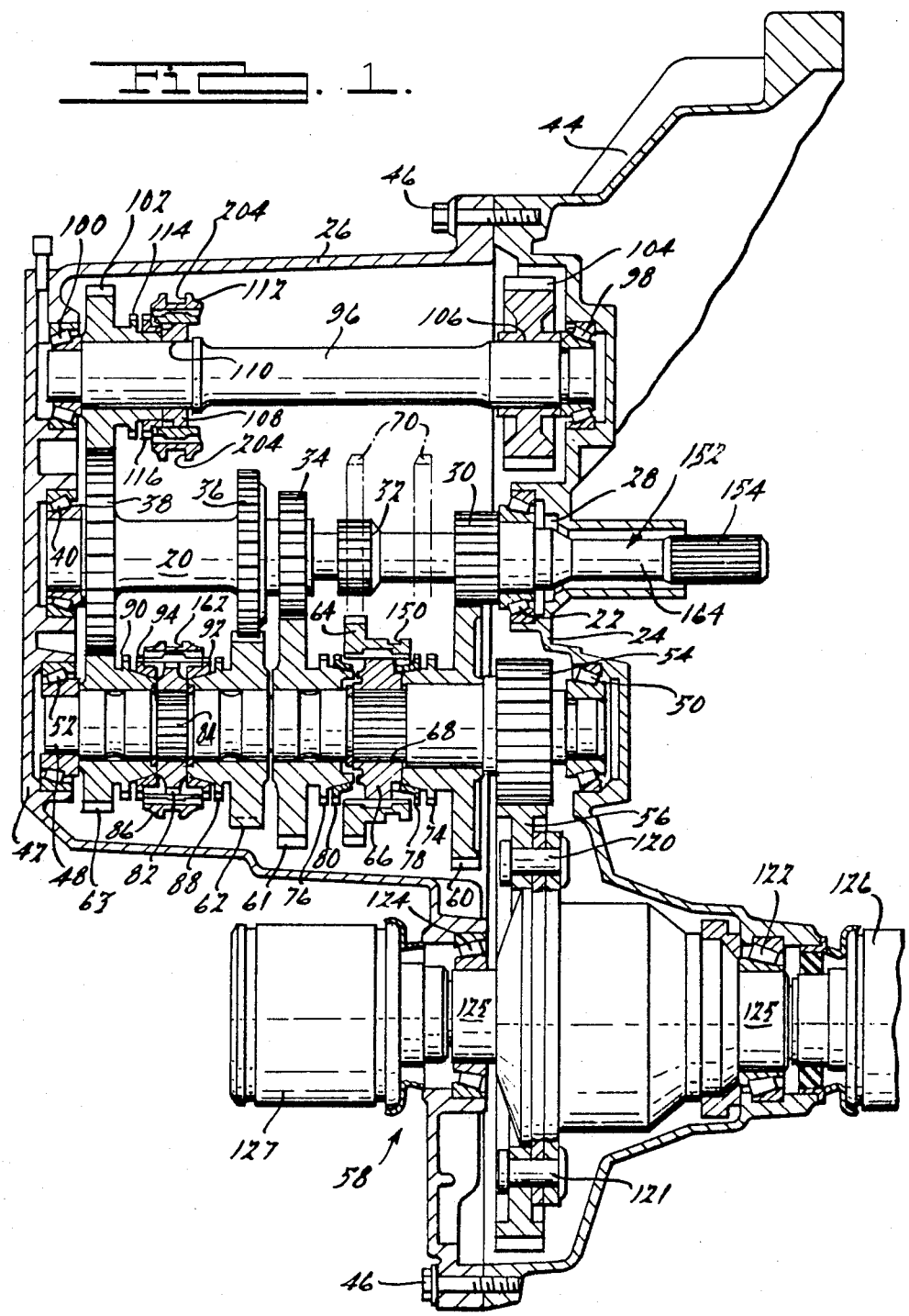

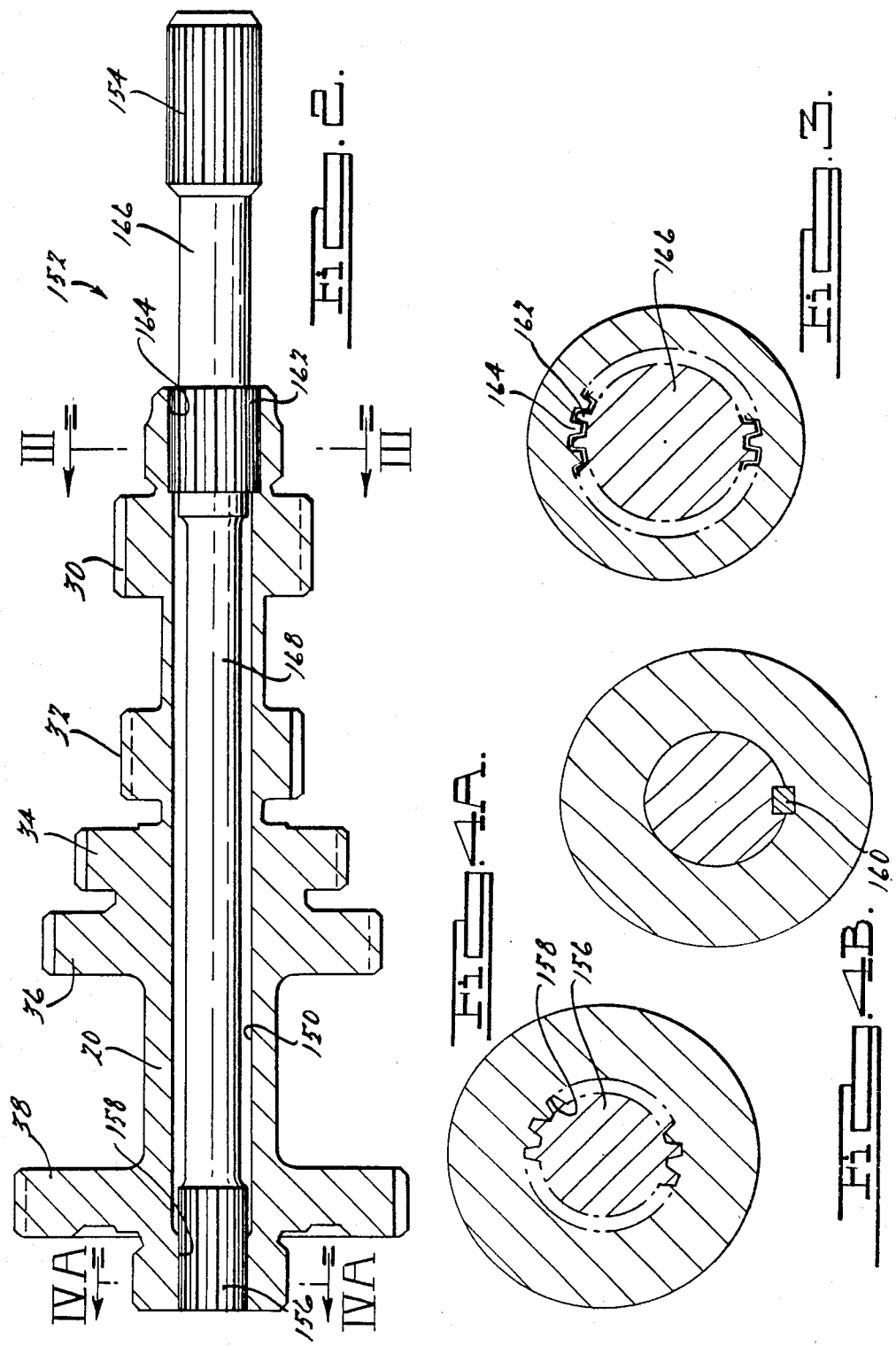

QUILL SHAFT INPUT CLUSTER GEAR FOR MANUAL TRANSMISSION

BACKGROUND OF THE INVENTION

1. Field of the Invention

This invention relates generally to manually operated automotive transmissions and more particularly to the cluster gear and input shaft arrangement of such transmissions.

2. Description of the Prior Art

In the operation of manual transmissions for automotive vehicles, a condition called rollover rattle has been identified in which noise associated with engine idle speed variations is produced. The noise associated with this condition rises while the clutch that selectively, driveably connects the engine to the input shaft of the transmission is engaged and the gear shift lever is moved to the neutral position, where none of the forward or reverse gears are engaged, and the engine is running at normal idle speed. Minor variations in the idle engine speed cause the gears on the cluster shaft and the pinions on the countershaft, with which the cluster shaft gears are continually engaged, to contact each other alternately on opposite lateral faces of the meshing teeth. The speed variations cause a minor amount of impact as the normal angular clearance between the meshing teeth is taken up due to the contact being made on opposite faces, rather than continuously on one face of the meshing teeth. The drive perceives this condition as a rattling sound emanating from the transmission.

Manual transmissions produce also another gear rattle noise that arises while the engine operates at light throttle conditions, where the vehicle speed is approximately 25 mph, and the transmission in one of the higher forward speed ratios, such as fourth gear. When these conditions are present, transmission produce an unwanted rattle that is offensive to the operator and the passengers.

Various attempts have been made to reduce or eliminate the noise associated with these conditions. For example, devices mounted on the cluster gear adjacent one of the gear wheels have been used to apply continuously a resilient force to a toothed wheel so that it maintains constant contact with both faces of a meshing gear teeth during operation of the transmission. Devices of this type are used to overcome rattle by preventing the impact that results when engine speed variations cause impact on opposite lateral faces of the gear teeth.

Other means, such as by changing the spring rate of the spring damper located on the neutral clutch that connects the engine crankshaft to the input shaft of the transmission, have been used to tune the vibrations of the driveline particularly those vibrations associated with torsional response.

SUMMARY OF THE INVENTION

The device according to this invention has a relatively low spring constant relative to the spring constant of the drive path through the transmission and helps to attenuate the vibrations and unwanted noise resulting from rollover rattle and gear rattle conditions. This device can be used with transversely mounted manual transmissions and can be accommodated within the transmission casing without altering the overall dimensions of the transmission or its various components.

This device permits large torsional loads to be carried through the transmission by a direct, stiff and high strength torsional load path. However, when torsional loads are low, as they are during normal driving conditions, a flexible, relatively soft torsional path replaces the relatively stiff torsional path between the engine crankshaft and the cluster gear.

According to this invention, an input shaft assembly for the transmission includes a cluster gear having distributed along its axis several forward drive and reverse drive input gears, which are in continuous meshing engagement with pinions carried rotatably on a countershaft. An input shaft, adapted to be clutched to the shaft of an engine, is mounted coaxially with the cluster gear and fitted within a bore extending the full length of the cluster gear. The end of the input shaft furthest from the engine is joined by a tight-fitting spline to the inner surface of the cluster gear. Located at the opposite end of the cluster gear nearest to the engine, the input shaft is joined by a loose fitting spline connection to the cluster gear. The torsional stiffness and strength of the portion of the input shaft located between the splines is substantially less than those of the portion of the input shaft located between the clutch and the loose fitting spline connection.

The circumferential clearance between the spline teeth is taken up during high torque conditions due to torsional displacement of the input shaft relative to the cluster gear. When this occurs, the stiff, high strength portion of the input shaft carries the major portion of the torque and transmits it directly to the cluster gear. However, during normal operating conditions when input shaft torque is substantially lower, most of the torque is transmitted from the clutch along the input shaft through the reduced diameter section to the far end of the cluster gear assembly back toward the engine along the cluster gear to its input gear that corresponds to the selected drive ratio. This circuitous path is traversed rather than the short stiff path because the magnitude of the torque is too low to twist the input shaft relative to the cluster gear. Therefore, the angular clearances between the spline teeth at the loose fitting spline connection are not taken up. During low torque conditions when the relative angular displacement between the cluster gear and the input shaft is lower than the clearance at the spline, the torsionally soft torque transfer path is automatically used.

BRIEF DESCRIPTION OF THE DRAWINGS

FIG. 1 is a cross section through a multiple countershaft manual transmission and the differential mechanism for use with the input shaft assembly of this invention.

FIG. 2 is a cross section through a diametric plane of the input shaft assembly according to this invention.

FIG. 3 is a cross section taken at plane III—III of FIG. 2.

FIGS. 4A and 4B are cross sections taken at plane IV—IV of FIG. 2.

DESCRIPTION OF THE PREFERRED EMBODIMENT

Referring first to FIG. 1, an input shaft assembly 20 is journalled in a bearing 22 mounted in the support wall 24 of the transmission housing 26. The shaft seal 28, located in an annular recess formed in the support wall 24, seals the outer periphery of shaft 20.

Formed on or carried by shaft 20 are five torque input gears shown respectively at 30, 32, 34, 36 and 38. These gears form torque delivery paths during operation in low speed ratio, reverse, second speed ratio, third speed ratio and fourth speed ratio, respectively. Drive gear 38 further operates to provide a portion of the torque delivery path for the fifth speed ratio. The left end of the input shaft is journalled by bearing 40 in a bearing opening formed in the end wall 42 of the housing 26. The right-hand end of the housing is bolted to the left-hand end of the clutch housing 44 as indicated by the attachement bolt 46.

A countershaft 48 is journalled at one axial end in bearing 50, which is received in a recess formed in wall 24, and at the opposite end in bearing 52, which is received in a recess formed in the end wall 42. Output gear 54 is fixed to or integrally formed with countershaft 48 and meshes with the output gear 56, which drives a differential gear assembly designated generally by the reference character 58. The countershaft supports pinions 60-63, each forming a part of the torque delivery paths for low speed ratio, second speed ratio, third speed ratio and fourth speed ratio. The pinions are journalled on the outer surface of the countershaft.

A reverse gear 64 is formed integrally with the sleeve of synchronizer clutch 66, which is splined at 68 to the countershaft 48. A reverse drive idler 70, which moves between the extremities of its range shown in FIG. 1, meshes with the teeth of the reverse input gear 32 and the reverse pinion 64 when it is moved into alignment with those gears.

Reverse gear 64 has internal clutch teeth adapted to engage dog teeth 74, 76 formed respectively on the hubs of output gear wheels 60 and 61. Synchronizer rings 78, 80 act to synchronize the speed of the reverse gear 64 with the speed of pinions 60 or 61 before engaging the associated dog teeth of the pinion. In this way the pinions are driveably connected through the synchronizer hub to countershaft 48.

When the reverse idler is aligned with gear 32 and reverse pinion 64, a reverse torque delivery path is completed between the input shaft 20 and the output gear 54. When operating the transmission in any ratio except reverse ratio, reverse idler 70 is located at the right-hand end of its range of motion.

A three-four synchronizer clutch 82 is splined at 84 to countershaft 48 and carries external splines on which is internally splined clutch sleeve 86 is slidably mounted. Sleeve 86 has internal clutch teeth adapted to engage dog teeth 88, 90 formed respectively on the hubs of pinions 62 and 63. The synchronizer clutch rings 92, 94, located between hub 82 and pinions 62, 63, establish speed synchronism between the countershaft and the selected gear in accordance with the direction that clutch sleeve 86 is moved.

An auxiliary countershaft 96 is rotatably supported by bearings 98 and 100 on the walls of the clutch housing and transmission casing, respectively. The fifth speed ratio pinion 102 is journalled on the outer surface of countershaft 96 and is in continuous meshing engagement with input gear 38 and fourth speed pinion 63. A fifth speed output gear 104 is splined at 106 to countershaft 96 and is in continuous meshing engagement with output gear 56 located between pinion 102 and gear 104. A third synchronizer clutch hub 108 is splined at 110 to the countershaft. The hub has external splines on which an internally splined clutch sleeve 112 is mounted. The sleeve is formed with internal clutch teeth adapted to engage external dog teeth 114 on the hub of the fifth speed pinion 102. A synchronizer clutch ring 116, located between the dog teeth and the clutch hub, establishes synchronism between countershaft 96 and pinion 102. The differential gear assembly 58 includes output gear 56, which is riveted to flange formed on the differential assembly at 120, 121. The differential is journalled at one end of the bearing 122, which is received in an annular recess formed in the end wall 24, and at the opposite axial end by the bearing 124, which is received in an annular recess formed in the transmission housing 26. Bevel gears mounted on the driveshafts transmit engine torque to each of two constant velocity universal joints 126, 127, through which power is transmitted to each of the forward wheels of the vehicle.

Referring now to FIG. 2, the input cluster gear 20 on which the several forward drive and reverse drive input gears are formed integrally has a central, axially directed bore 150. Fitted within the bore is an input shaft 152 having at one end an external spline 154 adapted to be driveably connected to the input side by a friction clutch through which the engine crankshaft is connected to the transmission input shaft. The opposite end of shaft 152 is formed with an external spline 156 that engages an internal spline 158 formed on the inner surface of the bore 150 of the cluster gear. Alternatively, the left-hand end of the cluster gear 20 and input shaft 152 are formed with a keyway 160 into which a key is inserted to transmit power between the shafts. Whether the connection is made by way of a spline or key, the connection is rigid and close fitting so that virtually no angular rotation of the cluster shaft spline 158 can occur relative to the input shaft spline 156.

Located on shaft 166 between splines 154, 156 and aligned with the right-hand end of the cluster gear is a third external spline 162 whose teeth are in mesh with an internal spline 164 formed on the cluster gear. The fit between the teeth of spline 162 and those of splines 164 is loose and has circumferential or angular clearance between adjacent teeth when the shafts are assembled and fixed in position with respect to one another by the engagement of splines 158 and 156. However, the circumferential or angular clearance, seen best in FIG. 3, between the teeth of splines 162 and 164 is small enough so that when torque applied to input shaft 152 is large, the clearance between the adjacent spline teeth will be taken up due to the sum of the torsional displacements of the portion of the input shaft between splines 156 and 162 and the cluster gear between spline 158 and spline 164. During these high torque conditions, the adjacent faces of the teeth of splines 162 and 164 are brought into contact and torque is transmitted along the large diameter portion 166, the portion of input shaft that extends between splines 154 and 162 to the cluster gear, but relatively little of the torque is carried along the small diameter portion 168 of the input shaft.

During normal driving conditions when the torque is low and a circumferential clearance exists between the teeth of splines 162 and 164, the torque is carried by the input shaft from spline 154 along portions 166 and 168 to spline 156. There the torque is transferred to spline 158 and is carried along the cluster gear to the input gear corresponding to the selected drive ratio. This torque delivery path adds additional length and flexibility to the structural path along which torque is transmitted from the engine to the selected input gear. The diameter of portion 168 is set to produce an acceptable torsional spring constant as required to tune the system and attenuate vibrations and noise.

For example, when the first gear ratio is selected, synchronizer clutch 68 driveably connects pinion 60 to the countershaft. If the torque is low, the torque delivery path includes both large diameter portion 166 ad a small diameter portion 168 of the input shaft 152, splines 156 and 158, the length of the cluster gear from spline 158 to first ratio input gear 30, pinion 60, synchronizer clutch 68, countershaft 48, output gear 54, differential mechanism 58, constant velocity joints 126, 127 and the axle shafts to the front wheels of the vehicle. However, if the torque is high and the first speed ratio is selected for operation, then the torque delivery path includes only the large diameter portion 166 of the input shaft from spline 154 to spline 162, and the portion of the cluster gear from spline 164 to the first speed ratio input gear 30. The other portions of the torque delivery path previously described transmit torque from gear 30 to the axle shafts. It can be seen that when torque conditions are high, the torsional spring rate through which power is transmitted through the transmission is a shorter and stiffer path than the path through which torque is transmitted when torque conditions are low. Of course, it is desireable to size the diameter of portion 168 of the input shaft as small as possible in order to reduce the spring constant during normal torque conditions consistent with the torsional strength required. This portion of the input shaft has substantially less capacity to transmit high torque than the large diameter portion.

When the magnitude of the torque causes sufficient angular displacement of the input shaft and cluster shaft compared to the clearance between the spline teeth, torque is transmitted through spline connections 162 and 164, but a minor portion of the input torque is carried by the reduced diameter section 168 to cluster gear 20. However, most of the torque is transmitted directly from portion 166 through splines 162, 164 to the cluster gear. The portion of the input torque that is carried by each of these paths have approximatey the same relationship to the total torque as the torsional spring constants of the two paths have to the total torsional spring constant of both paths.

Although the input shaft and cluster gear assembly has been described with respect to a transverse manual transmission, this invention can be used effectively in a manual transmission that transmits power to the rear wheels of the vehicle.

Having described the preferred embodiment of my invention, what I claim and desire to secure by U.S. Letters Patent is:

1. An input shaft assembly for tuning the natural frequency of a transmission having a torsional load connected thereto comprising:
   an input shaft drivably connectable to the load, having a first portion located near the connection to the load and having a second portion more distant from the connection to the load, the torsional stiffness of the first portion being large relative to the torsional stiffness of the second portion;
   a cluster gear having a gear wheel driveably connected thereto located along its length;
   first means for driveably connecting the first portion of the input shaft to the cluster gear when angular displacement of the cluster gear relative to the input shaft reaches a predetermined magnitude and for permitting unrestricted angular displacement of the cluster gear relative to the input shaft when said angular displacement is below said predetermined magnitude; and
   second means for connecting the second portion of the input shaft to the cluster gear.

2. The assembly of claim 1 wherein the cluster gear has a central bore extending along its length and the input shaft is at least partially located within the bore.

3. The assembly of claim 1 wherein the first portion of the input shaft is located between the connection to the load and the second input shaft portion.

4. The assembly of claim 2 wherein the first connecting means includes:
   a internal spline formed on the inner surface of the cluster gear bore;
   an external spline formed on the outer surface of the cluster gear, having teeth meshing with the teeth of the internal spline, the internal teeth and external teeth having circumferential clearances therebetween that permit angular displacement of the cluster gear relative to the input shaft.

5. The assembly of claim 2 wherein the second connecting means includes:
   an internal spline formed on the internal surface of the cluster gear;
   an external spline located on the outer surface of the input shaft, having teeth meshing with the teeth of the internal spline, the internal teeth and external teeth permitting substantially no angular displacement of the cluster gear relative to the input shaft.

6. The assembly of claim 1 wherein the first connecting means includes:
   a first spline formed on the cluster gear;
   a second spline formed on the input shaft, having teeth meshing with the teeth of the first spline, the teeth of the first and second splines having circumferential clearances therebetween that permit angular displacement of the cluster gear relative to the input shaft.

7. The assembly of claim 6 wherein the second connecting means includes:
   a third spline formed on the cluster gear;
   a fourth spline formed on the input shaft, having teeth meshing with the teeth of the third spline, the third and fourth splines permitting substantially no angular displacement of the cluster gear relative to the input shaft.

8. The assembly of claim 1 wherein the cluster gear has multiple gear wheels located along its length, axially spaced from the second connecting means.

9. The assembly of claim 1 wherein the second input shaft portion has a smaller diameter than the diameter of the first input shaft portion.

10. The assembly of claim 1 wherein the first and second portions of the input shaft and the portion of the cluster gear that extends from the second connecting means to the gear wheel are arranged in series between the connection to the load and the gearwheel, whereby the first connecting means permits unrestricted said angular displacement below said predetermined magnitude from the gear wheel to the second connecting means and of the second input shaft portion from the second connecting means to the first connecting means.

11. The assembly of claim 6 wherein the circumferential clearances between the teeth of the first and second splines are greater than the sum of the angular displacement of the cluster gear from the gearwheel to the second connecting means plus the angular displacement of the input shaft from the second connecting means to the first connecting means due to a first predetermined torsional load.

12. The assembly of claim 11 wherein the circumferential clearances between the teeth of the first and second splines are less than the sum of the angular displacement of the cluster gear from gear wheel to the second connecting means plus the angular displacement of the input shaft from the second connecting means to the first connecting means due to a second predetermined torsional load.

* * * * *